United States Patent [19]

Tabary

[11] 4,032,176
[45] June 28, 1977

[54] METHOD OF ASSEMBLING SEAMLESS FLEXIBLE TUBING AND THE TUBULAR ASSEMBLY OF LENGTHS OF SUCH TUBING

[75] Inventor: Jean Pierre Tabary, Froissy, France

[73] Assignee: Viscora, Paris, France

[22] Filed: Feb. 6, 1976

[21] Appl. No.: 655,802

[30] Foreign Application Priority Data

Sept. 5, 1975  France .............................. 75.27312

[52] U.S. Cl. .................................. 285/18; 285/260; 285/293; 285/423; 156/158; 156/212; 156/287

[51] Int. Cl.² ........................................ F16L 35/00

[58] Field of Search .............. 285/DIG. 16, 21, 18, 285/260, 423, 293; 156/158, 212, 287, 285, 296; 403/300, 393; 52/2; 175/103

[56] References Cited

UNITED STATES PATENTS

| 2,050,023 | 8/1936 | Slayter | 285/293 |
|---|---|---|---|
| 3,364,632 | 1/1968 | Isaac | 52/2 |
| 3,635,504 | 1/1972 | Borden et al. | 285/260 |
| 3,904,458 | 9/1975 | Wray | 156/158 |

*Primary Examiner*—Dave W. Arola
*Attorney, Agent, or Firm*—Sughrue, Rothwell, Mion, Zinn and Macpeak

[57] ABSTRACT

Two or more lengths of seamless tubing, for example artificial sausage casing are assembled by longitudinally aligning the end portions thereof overlapping and joined to each other by an adhesive strip band but for the time without internal communication therebetween. Internal communication between the lengths of tubing is established, for example, by introducing compressed gas into one tubing length remote from junction zone which causes this tubing length to take a cylindrical configuration moving its side walls (defined by its initially flattened shape) apart and thereby the side walls of the second joined tubing length are drawn with the corresponding side walls of the first tubing length by means of the adhesive strip band. As a result thereof the end portions of the side walls initially in contact with each other slide along each other and then out of contact in order to provide continuous internal communication in the tubular assembly. Accordingly the resultant end portions are interleaved as shown herein. A mandrel may be needed in place of the compressed air to separate the side walls and establish internal communication.

7 Claims, 14 Drawing Figures

METHOD OF ASSEMBLING SEAMLESS FLEXIBLE TUBING AND THE TUBULAR ASSEMBLY OF LENGTHS OF SUCH TUBING

The present invention relates to a method of joining two unseamed lengths of tubing end to end, the lengths of tubing initially being flattened with the inner surfaces of their respective side walls in contact in order to form a tubular assembly in which the tubular lengths are in continuous internal communication. In such a method the ends of the two lengths of tubing are in alignment and joined by an adhesive strip applied to the outer surfaces of both lengths of tubing. The invention also relates to tubular assemblies with continuous internal communication therein. The invention relates more particularly to the manufacture of tubular assemblies which are artificial casings for use in the foodstuffs industry, notably for sausages and the like.

Such sausage casings are formed by extrusion of cellulose tubes regenerated from viscose or by coating a roll of paper with viscose and regenerating the cellulose. The tubing thus formed is rolled flat in large diameter rolls. For use by sausage markers the sausage casing is sold in shirred form so that lengths of 20 to 30 meters take up only 30 to 50 centimeters, which lengths may be passed over a fitting nose for injecting the sausage filling into the casing thereby obtaining dry or wet sausages, or other sausage products. Under the force of the injection of the sausage filling, the casing progressively unshirrs and thus one may form individual sausages or frankfurters, for example, without pushing the sausage filling through the entire casing.

Yet the lengths feed by the extruders and rolled are not usually whole multiples of the lengths used for making the shirred casing. Moreover, manufacturing mishaps sometimes cause the rupture or defects leading to the severing or tearing of the extruded tubing. It is then necessary to choose the lengths of tubing permitting shirring without joining which produces considerable scraps thereby increasing costs or joining the lengths of tubing for better use of the extruded tubing, but the end to end assembly of tubing has to be compatible with the shirring operation.

In the shirring operation the tube rolled flat is unrolled and passed between two drive rollers pressing the tubing flat and threading it on a cylindrical shirring mandrel. The shirring mandrel has an axial passageway which is in communication with a source of pressurized gas so that the tubing is blown open for undergoing the shirring operation, by suitable means, which gives it the shape of a thick walled tube whose outer diameter is approximately equal to the outer diameter of the blown up tubular assembly and inner diameter approximately equal to diameter of shirring mandrel. It is evident that continuous internal communication along the length of the tubing to be shirred is difficult to harmonize with the shirring operation described above.

Regenerated cellulose sausage casings with special paper reinforcement, known as Fibrous casing, have inner surfaces which hardly adher to each other when in contact and for joining such casings end to end, it is common practice to insert the end of one length of casing into the end of the next length of casing, previously brought in alignment therewith then to provide a transverse band of adhesive strip which is also run along the outer surface of the lengths to be joined, the ends of the adhesive strip overlapping each other to seal the connection. It should be noted that such a transverse adhesive strip band as used in the present specification is a pressure sensitive adhesive tape strip which is rolled into a band with its side flaps partially superposed.

The operation of assembling or joining lengths of tubing end to end after extruding requires a certain dexterity and takes a rather long time because the ends to be joined must be cut transversely, one of the ends opened and the other inserted therein without folding, and then an adhesive tape strip applied thereto.

Such regenerated viscose casing which is not paper-reinforced is smooth and the inner surfaces of the side walls in contact with each other are difficult to separate as they tend to stick together. To join such casings end to end, the end portions are cut complementarily so that their free edges can mate with each other, and the adhesive tape strip on the mated lengths is formed so that the adhesive is only in contact with the outer surfaces of the side walls in order to prevent the blocking of the internal continuity. The joining of the lengths of tubing end to end thus requires great dexterity and care which works against the possibility of speedy execution.

I have discovered that, surprisingly, it is possible to effect the joining lengths of tubing end to end by side-by-side juxtaposition of flattened end portions of two lengths of tubing wrapped in a transverse band of adhesive tape initially without intercommunication between the interiors of the respective lengths of tubing, this intercommunication being effected by moving the side walls of the lengths of casing apart to give it a substantially cylindrical shape in the vicinity of the junction of the tubing lengths.

An object of the invention is a method of joining unseamed flexible lengths of tubing which are initially presented in flattened form with inner surfaces in contact with each other, in order to make a tubular assembly with continuous internal communication wherein two lengths of tubing are provided with their respective ends in alignment, the ends being joined by forming at least one transverse band of adhesive tape strip with its adhesive surface applied against the outer surfaces, of both lengths of tubing, wherein the improvement comprises the end portions to be joined being severed approximately transversely.

a. applying the outer surface of a first said length of tubing on the adhesive side of adhesive strip disposed perpendicular to the longitudinal axis of the said first length while providing on the adhesive strip a free zone ahead of the end of said first length of tubing and two lateral flaps; positioning the outer surface of one side wall of a second said tubing length in longitudinal alignment with said first tubing length against the outer surface of the second side wall of said first tubing length, the overlap of said first and second lengths being substantially less than half the width of the flattened side walls of the tubing lengths, successively folding over the side flaps of the adhesive strip on to the outer surface of the second side wall of said second tubing length thereby forming a sealing band of adhesive strip;

b. separating the inner surfaces of one of said tubing lengths proximate to the sealing band to give said one tubing length of cylindrical shape while putting the side walls of said other tubing length by the sealing band therewith at least until the mutual release of the second side wall of said one tubing length and the first side wall of said other tubing length, the internal communication between the tubing lengths thus being established.

As the first phase (a) is executed quickly and without special precautions, because the section of the end portions of the tubing lengths is only approximately transverse, it is not necessary to open a tubing length, and the length of overlap of the tubing lengths is not limited to close tolerances. The second phase (b) can take place whenever continuous internal communication along the lengths of the tubular assembly is required, this implies that the tubing assembly will take on a cylindrical configuration. In fact when a tubing length attains cylindrical configuration proximate to the junction area or assembly zone of the tubing lengths, the opposed side walls of the tubing lengths move away from each other putting therewith the opposed side walls respectively of the second tubing length by means of the adhesive strip sealing band. During this movement the outer surfaces of the first tubing length and of the second tubing length slide on each other in the overlap zone then separate from each other thereby simultaneously establishing communication between the tubing lengths.

Preferably in the second phase (b) of the method the side walls of the first tubing length are separated by blowing a pressurized fluid introduced at the free end of the tubing length. The super atmospheric pressure established by the pressurized fluid automatically causes the tubular assembly to attain cylindrical configuration and facilitates the release of the superposed side wall of the tubing lengths.

According to a modified separation step the side walls of the first length of tubing are separated by inserting through the free end thereof a mandrel until it enters the second tubing length.

Preferably the overlap is between one-fifth and one-twentieth of the nominal width of the side walls lying flat, the width of the adhesive strip being at least three times the longitudinal dimension of the overlap. These tolerances correspond to the most favorable conditions of sure and rapid assembly.

According to another aspect of the invention an article is provided comprising a tubular assembly of two consecutive tubing length assembled end to end according to the invention and in continuous internal communication.

Another aspect of the invention is the preparation of an intermediate produce by the first phase (a) of the invention.

A flexible tubular assembly formed by joining at least two tubing lengths by a transverse adhesive strip band stuck to the periphery of each of the two tubing lengths proximate to the opposed ends thereof is surprising by the fact that the band is struck to one half of the periphery of each of the tubing length end portions, the second half of the periphery being offset therefrom by the longitudinal dimension of the overlap, substantially less than one quarter of the periphery thereof, the half peripheries being stuck up to the end diametrically opposed thereto.

Other features and advantages of the invention will be brought out in the description will follow by way of example with reference to the accompanying drawings in which.

Figure 1:
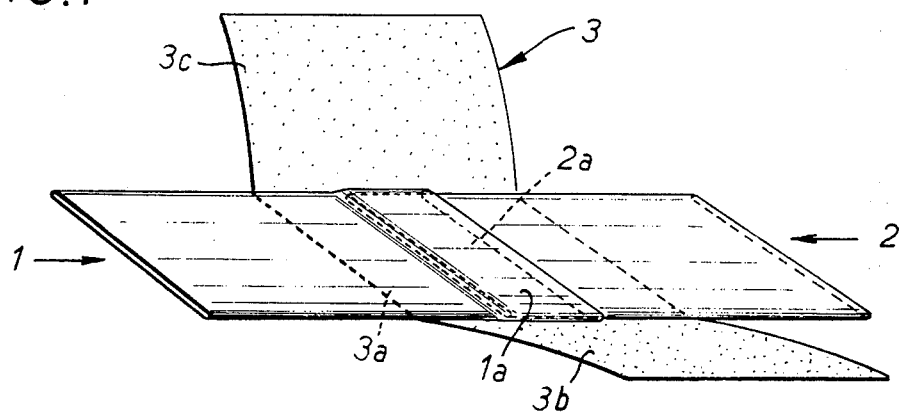
FIG. 1 illustrates in perspective view a conventional method of joining lengths of flexible tubing end to end.
Figure 2:
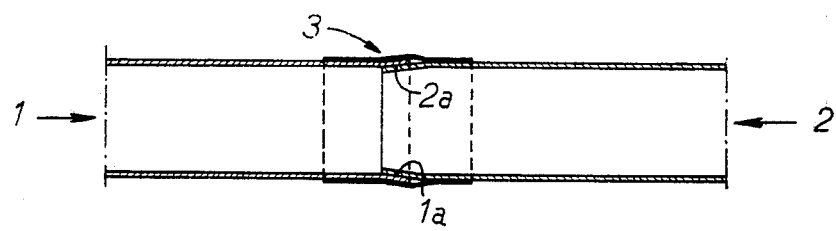
FIG. 2 shows the tubing assembly of FIG. 1 in longitudinal section after it is blown up.

Conventional joining of the ends of lengths of tubing (which are sausage casings) is shown in FIG. 1 and carried out in the following manner: the end portion 2a of one flattened length 2 of tubing is inserted into the partly opened end portion 1a of the other flattened length 1 of tubing. The two lengths 1 and 2, inserted inside each other, are applied against the central portion 3a of an adhesive tape strip 3 disposed transversely, then the side flaps or portions 3b and 3c of the adhesive strip 3 are folded over the overlapping end portions 1a, 2a of the lengths of tubing. After blowing up the tubular assembly of joined tubing lengths into cylindrical configuration it is, as shown in section in FIG. 2, with the slightly concially tapering end portion 2a of tubing length 2 deformed inside the end portion 1a of the tubing length 1 which is slightly conically flared, the transverse adhesive strip forming a sealing band. It has been found that this type of assembly tends to form longitudinal folds in the inserted end portion 2a if the casing material does not have the required suppleness or flexibility, thereby leading to longitudinal folds which are detrimental to sealing.

Figure 3:
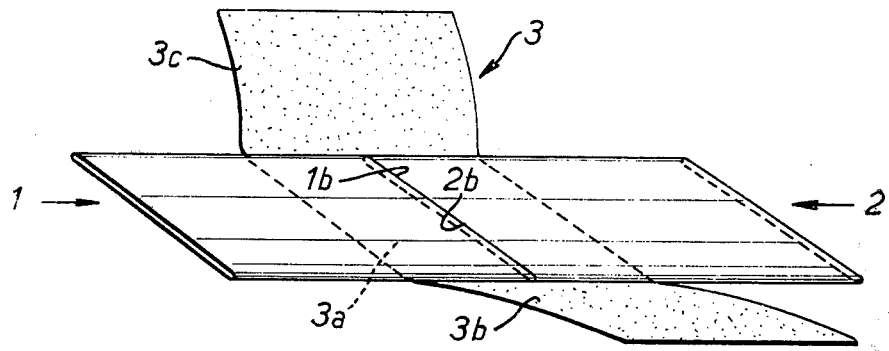
FIG. 3 shows a perspective view of another known tubing assembly in which the opposed edges of the tubing lengths are in abutment.
Figure 4:
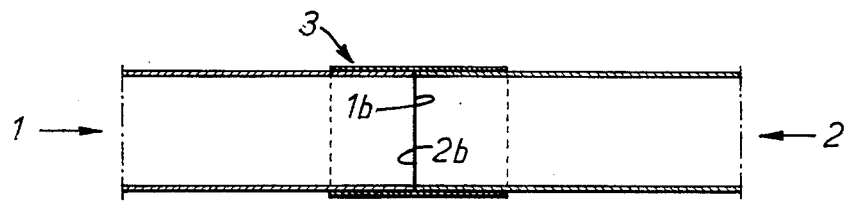
FIG. 4 shows a longitudinal sectional view of the tubing assembly of FIG. 3 after it is blown up.
Figure 5:
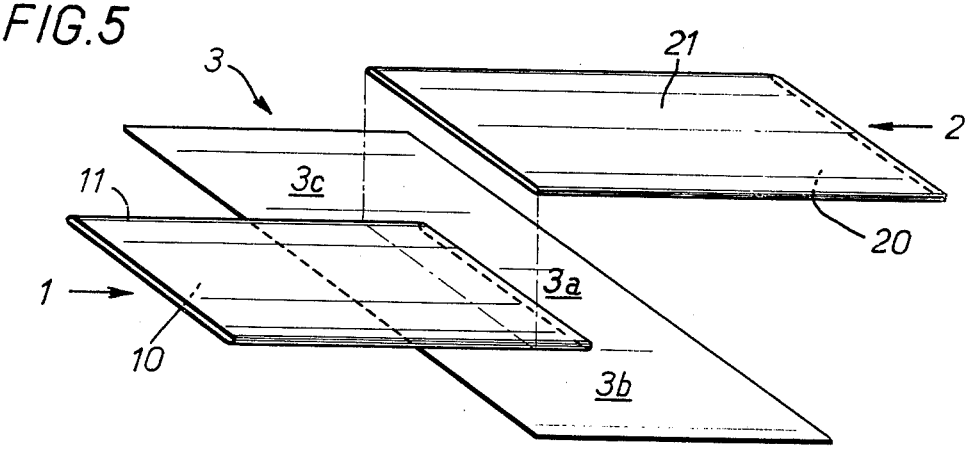
FIGS. 5–8 illustrate in perspective the consecutive steps of the method joining or assembling tubing lengths according to the present invention.
Figure 6:
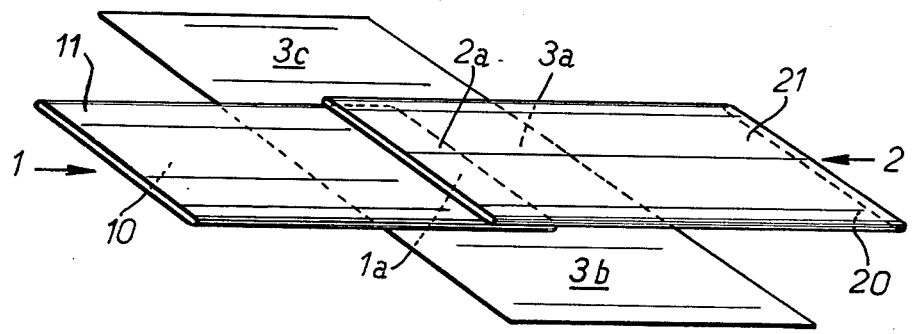
Figure 7:
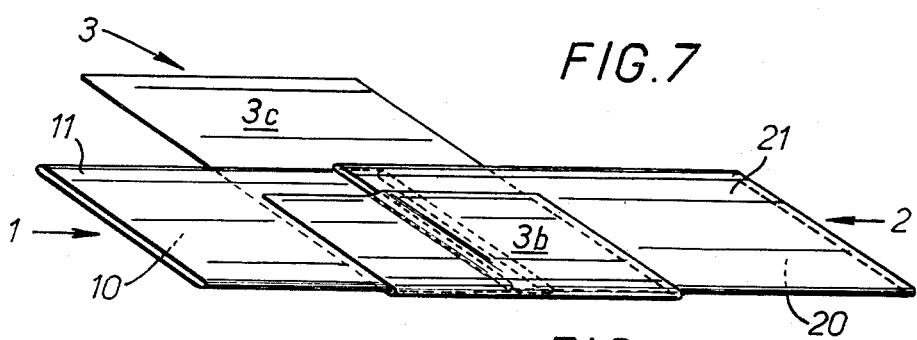
Figure 8:
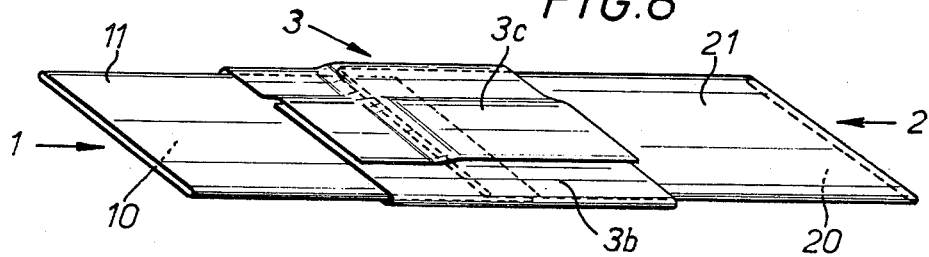

For joining lengths of casing of the above type it is possible to proceed according to modified method illustrated in FIG. 3. The two tubing lengths, 1 and 2 are cut complementarily along lines 1b and 2b so that when the aligned lengths of tubing 1 and 2 are applied against the central portion 3a of the adhesive strip with the opposed complementary edges 1b and 2b are contiguous with each other, without any space therebetween or overlap. By folding the side flaps or portions 3b and 3c of the adhesive strip the sealing band is formed and then it is blown up, taking on a cylindrical configuration as depicted in FIG. 4.

According to a mode of the method according to the invention illustrated in FIGS. 5–12, the assembly or joining of the lengths of seamless tubing 1 and 2 considered for the sake of explanation to have opposed side walls 10, 11 and 20, 21 respectively, owing to the flattened configuration with inner surfaces, in contact with each other, comprises a first assembly phase represented in FIGS. 5–8 followed by a second internal communication phase represented in FIGS. 9–12. In the course of the first assembly phase the adhesive side of adhesive strip 3 is applied to the outer surface of side wall 10 of one tubing length while forming a free central zone 3a ahead of the tubing length 1 and two side portions or flaps 3b and 3c. Then (see FIG. 6) the outer surface of the side wall 20 of the other length 2 is positioned in longitudinal alignment with the first tubing length 1 on the outer surface of the side wall 11 of the first length 1 so that the end portion 2a of the second length 2 overlaps the end portion 1a of the first length 1. The end portion 2a is obviously entirely within the bounds of the adhesive surface of the adhesive strip 3.

Side portion or flap 3b of the adhesive strip 3 is folded over onto the outer walls 11 and 21 of the lengths 1 and 2 (FIG. 7), then the other side flap 3c is folded over onto the side flap 3b and the outer walls 11 and 21 so that the strip defines a sealing band which maintains the lengths 1 and 2 in alignment to form an assembly which may be wound on itself into a cylindrical roll or coil for transportation or storage.

Figure 9:
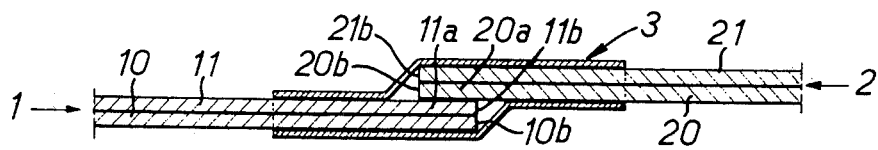
FIGS. 9–12 show in longitudinal cross section the successive steps for bringing the interiors of the tubing lengths into continuous communication with each other.

Continuous internal communication inside the assembly is established during the second, internal communication phase of the method as illustrated in FIGS. 9 through 12. For the sake of clarity the walls of the tubing has been shown much thicker than they really are. In FIG. 9 is shown a longitudinal sectional view of the assembly of tubular lengths in FIG. 8. The inner surfaces of the side walls 10 and 11 of the first length of tubing 1 and the inner surfaces of the side walls 20 and 21 of the second length of tubing 2 lies flat against each other, respectively. The outer surface of the end portion 11a of the first length of tubing 1 lies in contact with the outer surface of the second tubing length end portion 20a, and the adhesive band 3 is stuck to the outer surface of the wall portion 10 and the outer surface of the second tubing length 2 up to the respective edges 10b and 21b and to the outer surface of the side walls 11 and 20 spaced from the end portions 11a and 20a which are in overlapping juxtaposition.

Figure 10:
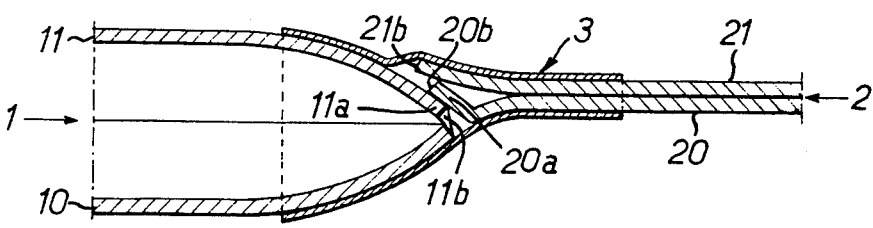
Figure 11:
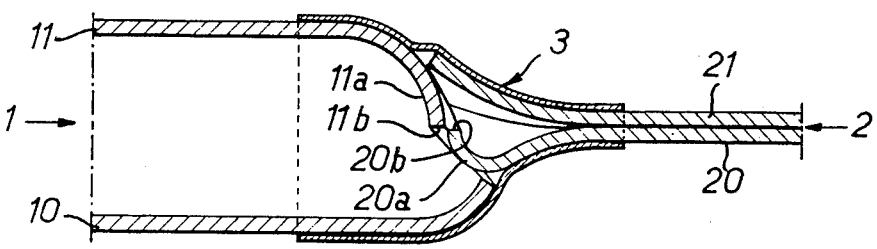
Figure 12:
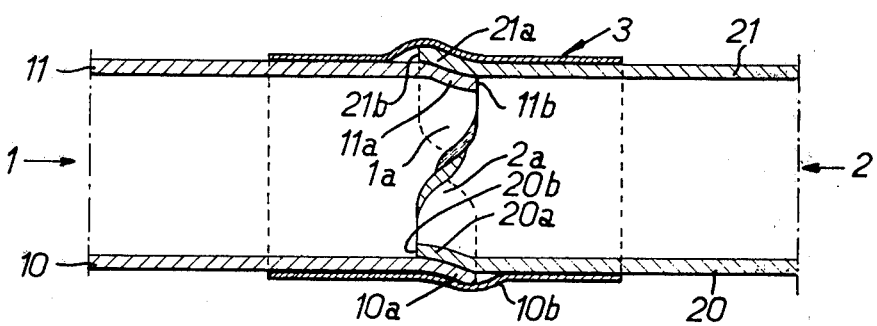

As the side walls 10 and 11 of the tubing length 1 progressively separate till they take on a cylindrical configuration up to the junction or assembly zone with the tubing length 2 (FIGS. 10, 11 and then 12), the side wall 10 tends to draw the side wall 20 with it and the side wall 11 tends to draw the side wall 21 with it, both by means of the adhesive strip 3. In the course of this movement the outer surfaces of the end portions 11a and 20a, which are in contact but not stuck together, slide along each other and the edges 11b and 20b move towards each other (FIG. 10). When the edges 11b and 20b arrive in the immediate vicinity of each other (FIG. 11) they "give" and move out of contact the end portions 11a and 20a effectively moving away from each other. The side walls 20 and 21 of the tubing length 2 are then no longer held in contact between the end portion 11a of the tubing length 1 and the band of adhesive strip, and the second tubing length 2 can turn take on a cylindrical configuration as shown in FIG. 12. As shown in FIG. 12 the end portion 11a is inside the end portion 21a whereas the end portion 10a is outside the end portion 20a. The side walls 10 and 11 as well as the side walls 20 and 21 are in peripheral continuity and joined by their end portions, thereby the combined end portions (comprising the end portions 10a and 11a and 20 and 21a respectively) are twisted and intertwined together at the junction of the side walls 10 and 11 and 20 and 21.

Figure 13:
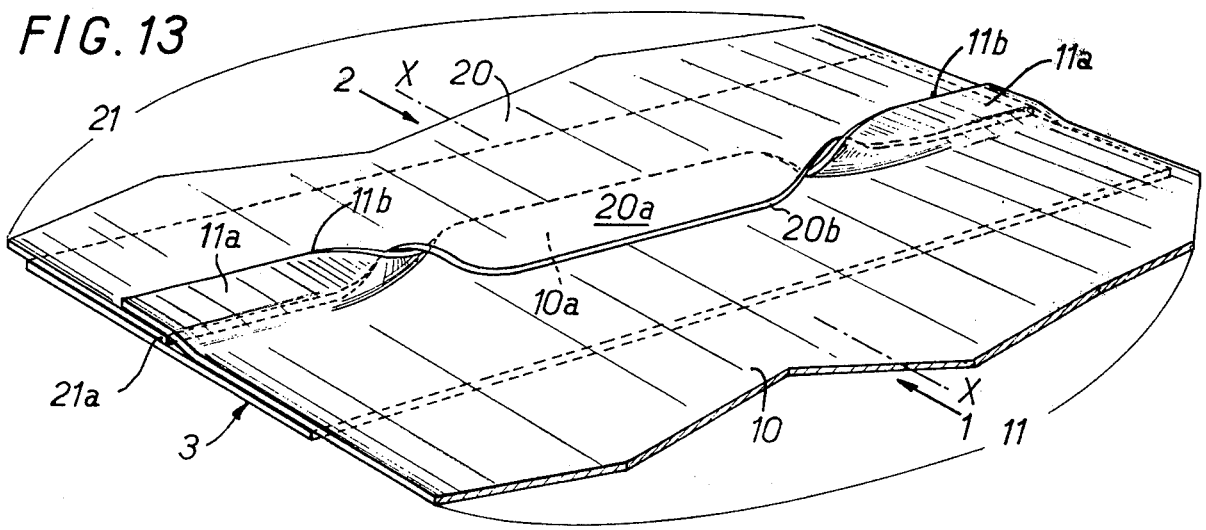
FIG. 13 is an enlarged perspective view of the assembly zone of the tubing assembly of FIG. 12 cut along a generatrix and laid out flat.

This is best viewed in FIG. 13 where a tubular assembly is cut longitudinally along a generatrix and laid out flat to show the manner in which the end portions of the tubing length are intertwined so that over approximately half the periphery of the assembly zone the edge 11b of the length of tubing is visible from inside the assembly and over half the periphery of the assembly zone the edge 20b of the tubing length 20 is visible from inside the assembly. Conversely, these edges 11b and 20b are covered over half the periphery of the assembly zone. This interleaving or intertwining arrangement defines two transition points where the edges 11b and 20b flaring out to each side thereof.

The separation of the side walls and intertwining of the end portions for attaining the cylindrical configuration may be accomplished by blowing into the tubing a pressurized fluid, such as compressed gas, which flows from one tubing length to the tubing length joined thereto, thereby establishing a continuity of internal communication between successive tubing lengths. It is also possible to employ, instead of compressed gas, a cylindrical mandrel having a diameter approximately equal to the inner diameter of the tubular assembly and introducing it into one length through the free end thereof until reaching the junction or assembly zone. The mandrel should preferably have a rounded end for facilitating penetration and not a pointed end which could unstick the adhesive band.

In order to determine the preferred amount of overlap, a series of tests were carried out on artificial sausage casing of regenerated cellulose, a casing of pure regenerated cellulose which measured about 110 mm in width when flattened, and a casing of paper-reinforced regenerated cellulose casing which measured 85 mm in width when flattened. With the 110 mm casing suitable internal communication openings were possible with overlaps up to 30 mm, whereas with the 85 mm casing it was possible to obtain overlaps up to 40 mm.

Since the opening is easier when the overlap is relative small, it is advantageous to choose average overlaps which are longitudinally as short as possible which assure a positive overlap; bearing in mind the inevitable variations always present with rapid handling, this average overlap length preferably ranges from one-fifth to one-twentieth of the wall thickness of the flattened casing.

Moreover, the longitudinal dimension of the adhesive strip will be chosen to be at least three times the longitudinal dimension of the overlap in order to assure a suitable adherence of the band to the outer surfaces of the tubing lenghts in the junction zone whereas the length of the adhesive band will permit an overlapped assembly junction between one and three centimeters.

Figure 14:
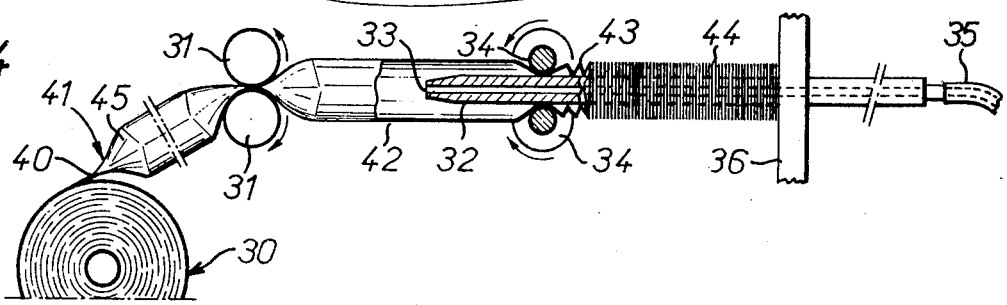
FIG. 14 is a schematic view of a setup for shirring artificial sausage casings with the ends of consecutive tubing lengths joined according to the present invention.

A particularly interesting application of the present invention is in the manufacture of shirred sausage casings of regenerated cellulose from viscose. In FIG. 14 is schematically illustrated a shirring machine. The flattened wound casing forms a roll or coil 30. The roll 30 is unwound and squeezed between two drive rollers 31 and 31' which are momentarily separated to receive the same; the open free end of the tubular assembly is threaded on a cylindrical mandrel 32 having an axial channel 33 through which pressurized gas from nose 35 is blown. By reason of the super atmospheric pressure the tubular assembly is blown up into cylindrical configuration 42 between two shirring rollers 34 and 34' and the roll 30. The drive rollers are then brought toward each other so as to feed the tubular assembly 40. The expanded tubular assembly 42 is driven back by the feeding of the drive rollers 31 and 31' and by the shirring rollers 34 and 34', which may be toothed for starting the transverse folds, drawing the tubular assembly onto the mandrel 32. The shirred tubular assembly 32 is compressed against the annular abutment 36 and takes on the overall configuration of a thick-walled tube 44.

In fact in FIG. 14 the tube is not blown up between the roll 30 and point 41 along the assembly owing to the junction assembly 45 which is still in the first phase shown in FIG. 10. Before the junction assembly 45 arrives at the top of the mandrel 42, the opening of the junction assembly is completed and it takes on it cylindrical shape (see FIG. 12) so that shirring of the junction assembly 45 is performed without any difficulty or transition.

Although the invention has been described with respect to the manufacture of artificial sausage casings, it is obvious that it is not limited to such an article nor the preferred method or apparatus described hereinabove. Various modifications of the present method and article produced thereby are of course possible within the scope of the appended claims.

What I claim is:

1. A method of assembling lengths of seamless flexible tubing wherein the lengths of tubing are initially flattened with their respective opposed inner side walls in contact, comprising the steps of: bringing two flattened lengths of tubing in longitudinal alignment with end portions of the two lengths overlying and contacting each other thereby defining an overlap between the free edges of the overlying end portions, the longitudinal length of the overlap being substantially less than half the flattened width of the tubing lengths; and wrapping an adhesive strip transversely around and in contact with the overlapped end portions and longitudinally therebeyond to form an adhesive strip band stuck to and adjoining the overlapped end portions.

2. A method according to claim 1, wherein the wrapping of the adhesive strip over the overlying end portions of the tubing lengths includes sticking the central portion of the strip disposed transversely of the aligned lengths of tubing to one pair of corresponding outer side walls of the lengths of tubing, the overlying end portions being located substantially in the middle of the central portion of the adhesive strip, and then successively folding over side flaps of the adhesive strip on the other corresponding pair of outer side walls of the lengths of tubing to form the band.

3. A method of assembling lengths of seamless flexible tubing wherein the lengths of tubing are initially flattened with their respective opposed inner side walls in contact, comprising the steps of: bringing two flattened lengths of tubing in longitudinal alignment with end portions of the two lengths overlying and contacting each other thereby defining an overlap between the free edges of the overlying end portions, the longitudinal length of the overlap being substantially less than half the flattened width of the tubing lengths; wrapping an adhesive strip transversely around and in contact with the overlapped end portions and longitudinally therebeyond to form a band stuck to and joining the overlapped end portions; separating the side walls of one of the tubing lengths at least in the vicinity of the band thereby giving it a substantially cylindrical configuration; drawing therewith the corresponding opposed side walls of the other tubing length by the adhesive strip band, and thereby intertwining the overlapping end portions and establishing continuous internal communication between the tubing lengths of the tubular assembly.

4. A method according to claim 3, wherein separating step comprises blowing pressurized fluid into said one tubing length through the end remote from its end portion.

5. A method according to claim 3, wherein the separating step comprises inserting a mandrel through the end of said one tubing length remote its end portion at least up into the end portion of the other length of tubing joining thereto.

6. A method according to claim 3, wherein the longitudinal length of the overlap is between one-fifth and one-twentieth of the width of the tube lengths side wall measured flat, the width of the adhesive strip being at least three times the longitudinal length of the overlap.

7. A tubular assembly of at least two lengths of seamless flexible tubing, opposed end portions of the lengths of tubing overlapping and contacting each other with the open ends of the tubes extending beyond each other in opposite directions, an adhesive strip wrapped around the overlapping end portions and the adjoining outer surfaces of the lengths of tubing longitudinally therebeyond, said adhesive strip being stuck to the free edge of one of the end portions over half the periphery of the tubular assembly and being stuck to the free edge of the other of the end portions over the other half of the peripheral of the tubular assembly, the stuck free edges of the lengths of tubing being longitudinally offset a distance equal to the longitudinal length of the overlap which is less than one-fourth of the circumference of the tubular assembly; whereby, separating the side walls of one of the tubing lengths at least in the vicinity of the band to give it a substantially cylindrical configuration causes drawing therewith of the corresponding opposed side walls of the other tubing length by the adhesive strip band and thereby intertwining the overlapping end portions and establishing continuous internal communication between the tubing lengths of the tubular assembly.

* * * * *